US011125900B2

(12) United States Patent
Kluver et al.

(10) Patent No.: US 11,125,900 B2
(45) Date of Patent: *Sep. 21, 2021

(54) ESTIMATING AN EARTH RESPONSE

(71) Applicant: PGS Geophysical AS, Oslo (NO)

(72) Inventors: Tilman Kluver, Oslo (NO); Stian Hegna, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 201 days.

This patent is subject to a terminal disclaimer.

(21) Appl. No.: 16/379,875

(22) Filed: Apr. 10, 2019

(65) Prior Publication Data

US 2019/0235112 A1    Aug. 1, 2019

Related U.S. Application Data

(63) Continuation of application No. 15/446,328, filed on Mar. 1, 2017, now Pat. No. 10,267,936.

(60) Provisional application No. 62/324,530, filed on Apr. 19, 2016.

(51) Int. Cl.
| | |
|---|---|
| *G01V 1/36* | (2006.01) |
| *G01V 1/37* | (2006.01) |
| *G01V 1/38* | (2006.01) |
| *G01V 1/48* | (2006.01) |

(52) U.S. Cl.
CPC ............. *G01V 1/36* (2013.01); *G01V 1/368* (2013.01); *G01V 1/37* (2013.01); *G01V 1/3808* (2013.01); *G01V 1/48* (2013.01); *G01V 2210/1293* (2013.01); *G01V 2210/1423* (2013.01); *G01V 2210/1427* (2013.01); *G01V 2210/21* (2013.01); *G01V 2210/24* (2013.01)

(58) Field of Classification Search
CPC . G01V 1/36; G01V 1/368; G01V 1/37; G01V 1/48; G01V 1/3808; G01V 2210/24; G01V 2210/21; G01V 2210/1293; G01V 2210/1423; G01V 2210/1427
USPC .......................................................... 367/21
See application file for complete search history.

(56) References Cited

U.S. PATENT DOCUMENTS

| | | | |
|---|---|---|---|
| 4,739,858 A | 4/1988 | Dragoset, Jr. | |
| 5,761,152 A | 6/1998 | Jacobsen et al. | |
| 6,751,559 B2 | 6/2004 | Fookes et al. | |
| 6,882,938 B2 | 4/2005 | Vaage et al. | |

(Continued)

FOREIGN PATENT DOCUMENTS

| | | |
|---|---|---|
| EP | 2696217 | 2/2014 |
| EP | 2793058 | 10/2014 |

(Continued)

OTHER PUBLICATIONS

Zhang et al., "A marine node simultaneous source acquisition trial at Atlantis, Gulf of Mexico," SEG Houston 2013 Annual Meeting, SEG Technical Program Expanded Abstracts, pp. 99-103, 2013.

(Continued)

*Primary Examiner* — Daniel L Murphy

(57) ABSTRACT

Estimating an earth response can include deconvolving a multi-dimensional source wavefield from near-continuously recorded seismic data recorded at a receiver position. The deconvolving can include spreading the near-continuously recorded seismic data across a plurality of possible source emission angles. The result of the deconvolution can be the earth response estimate.

21 Claims, 12 Drawing Sheets

(56) References Cited

U.S. PATENT DOCUMENTS

| | | |
|---|---|---|
| 6,906,981 B2 | 6/2005 | Vaage et al. |
| 7,031,223 B2 | 4/2006 | Kinkead |
| 7,257,049 B1 | 8/2007 | Laws et al. |
| 7,391,673 B2 | 6/2008 | Regone et al. |
| 7,502,690 B2 | 3/2009 | Thomsen et al. |
| 7,869,303 B2 | 1/2011 | Kinkead |
| 7,872,942 B2 | 1/2011 | Sollner |
| 7,916,576 B2 | 3/2011 | Beasley et al. |
| 7,941,273 B2 | 5/2011 | Thomsen et al. |
| 8,218,393 B2 | 7/2012 | Beasley |
| 8,295,124 B2 | 10/2012 | Abma |
| 8,299,794 B2 * | 10/2012 | Farrelly ............ G01V 3/083 324/337 |
| 8,345,510 B2 | 1/2013 | Hegna et al. |
| 8,395,966 B2 | 3/2013 | Moore et al. |
| 8,427,901 B2 | 4/2013 | Lunde et al. |
| 8,559,270 B2 | 10/2013 | Abma |
| 8,588,025 B2 | 11/2013 | Moldoveanu et al. |
| 8,596,409 B2 | 12/2013 | Parkes et al. |
| 8,619,497 B1 | 12/2013 | Sallas et al. |
| 8,724,428 B1 | 5/2014 | Sallas |
| 8,730,760 B2 | 5/2014 | Cambois et al. |
| 9,874,646 B2 | 1/2018 | Hegna et al. |
| 10,267,936 B2 * | 4/2019 | Kluver ............... G01V 1/37 |
| 2002/0181328 A1 | 12/2002 | de Kok |
| 2004/0013037 A1 | 1/2004 | Vaage |
| 2005/0034917 A1 | 2/2005 | Mathiszik et al. |
| 2007/0268781 A1 | 11/2007 | Meunier et al. |
| 2008/0019214 A1 | 1/2008 | Pramik |
| 2009/0168600 A1 | 7/2009 | Moore et al. |
| 2009/0323472 A1 | 12/2009 | Howe |
| 2009/0326895 A1 | 12/2009 | Beasley |
| 2010/0039894 A1 | 2/2010 | Abma |
| 2010/0189197 A1 | 7/2010 | Nakatani |
| 2010/0302900 A1 | 12/2010 | Tenghamn |
| 2011/0079461 A1 | 4/2011 | Allen et al. |
| 2011/0128818 A1 | 6/2011 | Eick et al. |
| 2011/0141850 A1 | 6/2011 | Scott et al. |
| 2012/0014212 A1 | 1/2012 | Eick et al. |
| 2012/0033525 A1 | 2/2012 | Abma et al. |
| 2012/0033526 A1 | 2/2012 | Hegna et al. |
| 2012/0147699 A1 | 6/2012 | Dellinger et al. |
| 2012/0147701 A1 | 6/2012 | Ross et al. |
| 2012/0155217 A1 | 6/2012 | Dellinger et al. |
| 2012/0155218 A1 | 6/2012 | Beasley et al. |
| 2012/0176861 A1 | 7/2012 | Abma et al. |
| 2012/0307591 A1 | 12/2012 | Hegna et al. |
| 2013/0028048 A1 | 1/2013 | Sollner |
| 2013/0028051 A1 | 1/2013 | Barkved et al. |
| 2013/0088235 A1 | 4/2013 | Hegna et al. |
| 2013/0088938 A1 | 4/2013 | Aaron et al. |
| 2013/0121109 A1 | 5/2013 | Baardman et al. |
| 2013/0322205 A1 | 12/2013 | Widmaier et al. |
| 2014/0016436 A1 | 1/2014 | Sollner et al. |
| 2014/0140168 A1 | 5/2014 | Howe |
| 2014/0303898 A1 | 10/2014 | Poole |
| 2015/0293241 A1 | 10/2015 | Hegna et al. |
| 2016/0047929 A1 | 2/2016 | Hegna et al. |
| 2016/0187513 A1 | 6/2016 | Poole et al. |
| 2018/0143334 A1 | 5/2018 | Hegna et al. |

FOREIGN PATENT DOCUMENTS

| | | | |
|---|---|---|---|
| WO | 2009131619 A2 | 10/2009 | |
| WO | 2015011160 | 1/2015 | |
| WO | WO-2015011160 A1 * | 1/2015 | ............ G01V 1/38 |

OTHER PUBLICATIONS

Jiang et al., "An analysis on the simultaneous imaging of simultaneous source data," SEG Denver 2010 Annual Meeting, Oct. 17-22, 2010, Denver, CO, 5 pp.

Abma et al., "An overview of BP's Marine Independedent Simultaneous Source Fields," SEG 2012 Las Vegas Annual Meeting, Nov. 4-9, 2012, Las Vegas, NE.

Abma et al., "Sparse inversion and the distribution of airgun energy over time," SEG Houston 2013 Annual Meeting, SEG Technical Program Expanded Abstracts, pp. 31-35.

Akerberg, "Simultaneous source separation by sparse Radon transform," SEG 2008 Las Vegas Annual Meeting Nov. 9-14, Las Vegas, NE, 5 pp.

Alexander et al., "Processing results of simultaneous source surveys compared to conventional surveys," SEG Houston 2013 Annual Meeting, SEG Technical Program Expanded Abstracts, pp. 104-108.

Howe et al., "Independent Simultaneous Sweeping in Libya—full scale implementation and new developments," 2009 SEG Annual Meeting, Oct. 25-30, Houston, TX, 3 pp.

Spitz et al., "Simultaneous source separation: a prediction-subtraction approach," SEG 2008 Las Vegas Annual Meeting, Nov. 9-14, Las Vegas, NE, 5 pp.

Moore et al., "Simultaneous Source Separation Using Dithered Sources," SEG Las Vegas 2008 Annual Meeting, pp. 2806-2810.

International Search Report & Written Opinion for related PCT Application PCT/EP2017/059281, dated Aug. 17, 2017 (19 pgs).

International Preliminary Report on Patentability for related PCT Application PCT/EP2017/059281, dated Nov. 1, 2018 (15 pgs).

* cited by examiner

ESTIMATING AN EARTH RESPONSE

CROSS-REFERENCE TO RELATED APPLICATIONS

This application is a continuation of U.S. Non-Provisional application Ser. No. 15/446,328, filed Mar. 1, 2017 and published as U.S. Publication No. 2017-0299743 A1 on Oct. 19, 2017 and will issue as U.S. Pat. No. 10,267,936 on Apr. 23, 2019, which claims priority to U.S. Provisional Application 62/324,530, filed Apr. 19, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers can be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control can cause the one or more sources, which can be air guns, marine vibrators, electromagnetic sources, etc., to produce signals at selected times. In some instances, each signal is essentially a wave called a wavefield that travels down through the water and into the subterranean formation. At each interface between different types of rock, a portion of the wavefield can be refracted, and another portion can be reflected, which can include some scattering, back toward the body of water to propagate toward the sea surface. The receivers thereby measure a wavefield that was initiated by the actuation of the source. In some instances, each signal is essentially a field that is imparted into the subterranean formation, which can induce a different field in response. The receivers can measure the different field that was induced by the actuation of the source.

DETAILED DESCRIPTION

Figure 1:
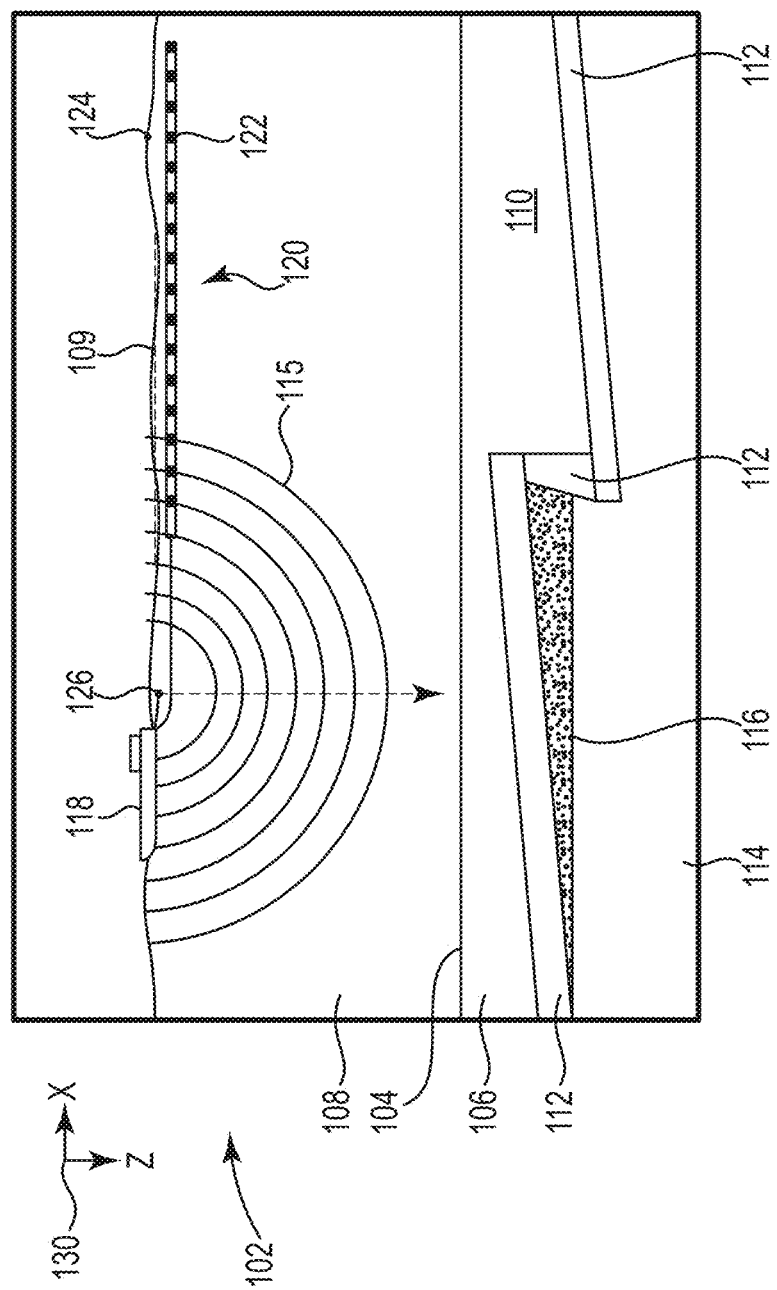
FIG. 1 illustrates an elevation or xz-plane view of marine surveying in which signals are emitted by a source for recording by receivers for processing and analysis in order to help characterize the structures and distributions of features and materials underlying the surface of the earth.

The present disclosure is related to estimating an earth response including deconvolving a source wavefield. As used herein, deconvolving includes reversing the effects of convolution on near-continuously recorded seismic data. For example, deconvolution is the inverse to convolution. In at least one embodiment, convolution in a time-space domain can be written as multiplication in a frequency-wavenumber domain, while deconvolution is a division in the frequency-wavenumber domain. As used herein, an earth response is what could be recorded with point sources each emitting an ideal spike, meaning the recording is of an actual response of the earth without ghost reflections or other outside influences (e.g., "actuation generated noise"). For instance, an earth response can be what would be recorded if acquisition-related effects from seismic data were removed. An earth response estimate is an approximate calculation or judgment of the earth response. An earth response can include a source wavefield containing propagation effects including surface multiples. In at least one embodiment, an earth response can include a source wavefield including all propagation effects including surface multiples. In an example seismic experiment, a primary source wavefield can be emitted by active sources. In such an example, the recorded seismic data can represent a convolution of the source wavefield with the earth response. In some source wavefield deconvolution processes, the source wavefield can be deconvolved from the recorded data. Seismic data are typically recorded in finite lengths (in the order of 10 seconds), and sources are typically actuated at a pre-defined interval such as 25 meters. However, these processes include assumptions that can cause errors and limitations.

An assumption is that a wavefield recorded in one actuation record is only associated with the actuation of the source in that actuation record. Because there can be some energy associated with previous actuations in a conventional actuation record commonly referred to as "actuation generated noise," the resulting data can contain some errors. The amount of actuation generated noise can depend on source configuration, actuation interval in time, and local geology.

Other assumptions can be made with respect to a source emission angle. As used herein, a source emission angle is the angle at which a source emitted a signal. Knowing the source emission angles from the sources in the received signals can be helpful in order to perform a deconvolution of a multi-dimensional emitted source wavefield from the receiver wavefield. In order to obtain such source emission angles, seismic data can be sorted into common receiver gathers assuming a receiver position containing data traces from multiple actuations with different source-receiver offsets between the source and the receivers. In at least one embodiment, the receiver position can be a substantially stationary receiver position and/or a stationary receiver position. As used herein, a stationary receiver position is a receiver position that is not moving and/or is not intended to be moved. As used herein, "substantially" means that a characteristic need not be absolute, but is close enough to the absolute characteristic so as to achieve the advantages of the characteristic. The source emission angles from the source are obtained from such common receiver gathers assuming that the source wavefield is identical in every actuation and that the common receiver gathers are sufficiently sampled in offset and source-receiver azimuth. However, in reality, the wavefield emitted from the sources contributing to the receiver position can vary from actuation to actuation, and the sampling in offset and source-receiver azimuth can be limited resulting in inaccuracies in the estimated source emission angles from the common receiver gathers. As used herein, a common receiver gather is a display of seismic traces that share a receiver. A seismic trace (e.g., receiver trace) is a recorded curve resulting from a movement measurement.

Because the recording of the seismic data can be initiated at the same time that the sources are actuated and the time length of the seismic records can be defined by the minimum time interval between source actuation times, the length in time of the data that can be imaged is limited by the time interval between when sources are actuated. This can limit how densely sources can be actuated both in space and time, and also limits how deep it is possible to image into the sub-surface.

In contrast, at least one embodiment of the present disclosure includes deconvolving a multi-dimensional source wavefield from near-continuously recorded seismic data recorded at a point receiver, without the limitations of the prior approaches. A point receiver can include a receiver in a position that can receive signals from a direction emitted at possible angles by a source. As used herein, "near-continuous" can include without meaningful breaks in the seismic recording. As would be understood by one of ordinary skill in the art with the benefit of this disclosure, operational circumstances can cause intermittent gaps in records (due to equipment failure, etc.), and "near-continuous recording" should be read to include records with intermittent or periodic gaps, whether planned or unplanned as well as records without intermittent or periodic gaps, thus including "continuous records." For simplicity, the term "near-continuous" and "near-continuously" will be used herein and do not exclude "continuous" or "continuously". Since the method is based on deconvolving a near-continuously recorded source wavefield, actuation generated noise may not be a concern. As used herein, a near-continuously recorded source wavefield refers to seismic data records or gathers of time-sampled traces that have been recorded without significant interruptions and refers to seismic-data records or gathers with any number of incomplete time-sampled traces. In at least one embodiment, an output-trace length and how deep to possibly image into the sub-surface can be chosen in processing and/or in an experimental setup. Further, spacing between the point sources along an actuation direction that are output from the source deconvolution can be chosen in processing and/or in an experimental setup.

In at least one embodiment, seismic data acquired as a near-continuously recorded source wavefield includes data recorded in one receiver position being one single near-continuous receiver trace, with the source wavefield contributing to this receiver position being a multi-dimensional source wavefield that is at least as long is the receiver trace.

It is to be understood the present disclosure is not limited to particular devices or methods, which can, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures can be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. For example, such processing can include analogous processing of modeled and measured marine survey data. The processing can include estimating an earth response, in at least one embodiment. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden can include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers can be coupled. In one type of marine survey, each receiver, such as the receiver 122 represented by the shaded disk in FIG. 1, comprises a pair of sensors including a motion sensor that detects particle motion in at least one orientation within the water, such as particle velocity or particle acceleration, and/or a hydrophone that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 can also be towed by other vessels, or can be otherwise disposed in fluid volume 108. For example, receivers can be located on ocean bottom cables or nodes fixed at or near the surface 104, and sources 126 can also be disposed in a nearly-fixed or fixed configuration. In at least one embodiment, seismic data can be acquired as a near-continuously recorded source wavefield, with the seismic data recorded at a particular receiver location. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Data collected by receivers is referred to herein as measured marine survey data. Before the marine survey data is processed, it is referred to as raw measured marine survey data.

FIG. 1 shows an expanding, spherical signal, illustrated as semicircles of increasing radius centered at the source 126, representing a down-going wavefield 115, following a signal emitted by the source 126. The down-going wavefield 115 is, in effect, shown in a vertical plane cross section in FIG. 1. The outward and downward expanding down-going wavefield 115 can eventually reach the surface 104, at which point the outward and downward expanding down-going wavefield 115 can partially scatter, can partially reflect back toward the streamers 120, and can partially refract downward into the subsurface volume 106, becoming elastic signals within the subsurface volume 106.

Figure 2:
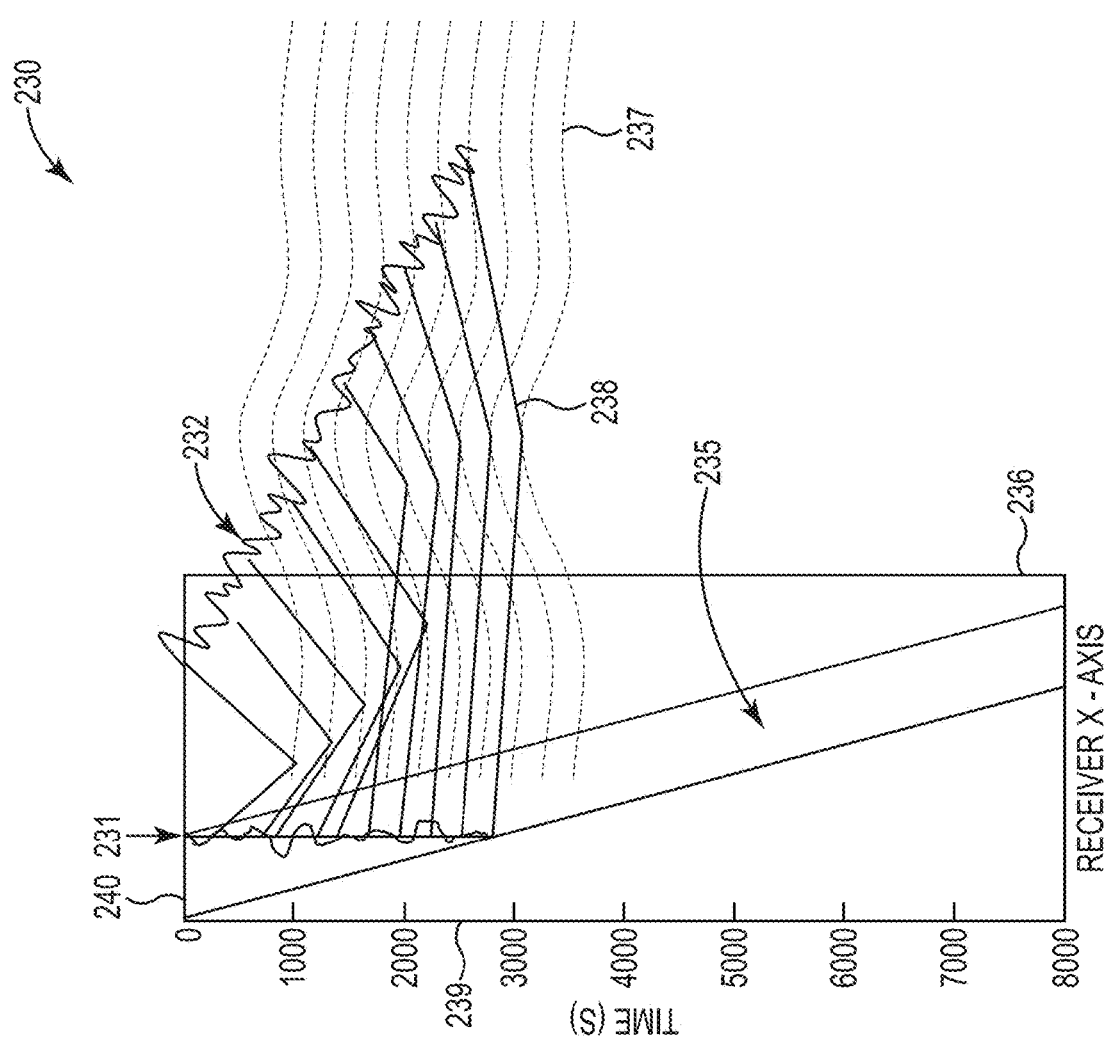
FIG. 2 illustrates a diagram of results of an example physical experiment for estimating an earth response.

FIG. 2 illustrates a diagram 230 of results of an example physical experiment for estimating an earth response. A multi-dimensional source wavefield is deconvolved from a one-dimensional receiver trace in the example. Representations of a receiver position 231(also known as a common receiver position) are illustrated, for example, in FIG. 2, as is a near-continuously recorded source wavefield 232, and a position of a seismic streamer as a function of time (within box 236). FIG. 2 illustrates recorded data that is a convolution of the source wavefield with the earth response, plus noise.

Box 236 illustrates a seismic survey. In this example, a vessel begins to move and begins recording signals at time 0 and moves in a straight line for a particular distance over a certain amount of time (8000 seconds in this example as illustrated on time axis 239). The vessel moves from left to right along axis 240, with a common, receiver positioned at 231. Area 235 between the diagonal lines illustrates a position of a seismic streamer towed behind the vessel as a function of time. While this example uses a towed streamer, other approaches to signal gathering can be used including ocean-bottom cables and/or nodes. Near-continuous recorded seismic data, which is a convolution of the source wavefield with the earth response, plus noise, falls within area 235.

Because a streamer's length is limited, moving over one receiver position takes a particular amount of time, in this example about 3000 seconds. A receiver trace can include data from a receiver position. For example, the receiver trace can include all data collected in one receiver position. Because the source towed is near-continuously emitting signals and is near-continuously moving, a signal can be illustrated within area 235, as well. The source can have a spatial extent equivalent to the streamer length and a temporal extent as long as the receiver trace, as illustrated in equation (10).

Dotted lines 237 are illustrations of a reflector in the subsurface, and lines 238 illustrate paths from a source wavefield 232 down into the earth which are then reflected from a reflector 237 in the subsurface, returned, and received by a receiver at position 231. The source wavefield 232 can be a near-continuously recorded source wavefield. In at least one embodiment, a line 238 illustrates a ray path into the subsurface (beginning at source wavefield 232), such that a source emits a signal at a particular angle that is reflected from a single reflector 237 and recorded at the receiver position 231. This angle and the angles of the other ray paths beginning at source wavefield 232 are unknown. For example, each ray path represents an actuation of a source, which happens near-continuously and at an angle different than a previous actuation, resulting in a signal reflected from the same reflector at a slightly different point in the subsurface. The source can include an impulsive source such as an air gun, or it can include a non-impulsive source such as a vibrator near-continuously emitting signals. For example, at least one embodiment of the present disclosure is applicable to both impulsive sources triggered with any time interval and non-impulsive sources. The source wavefield can be emitted near-continuously.

Source emission angles cannot be estimated from a single receiver trace. At least one embodiment of the present disclosure includes deconvolving the source wavefield from the wavefield in the recorded receiver trace across possible source emission angles, using the same receiver trace for the source emission angles. In such an example, no assumptions are made regarding source emission angles. This can result in received signals being at the correct source emission angle. However, since the received signals can be from other source emission angles also, some noise can be created by this deconvolution process.

Figure 5:
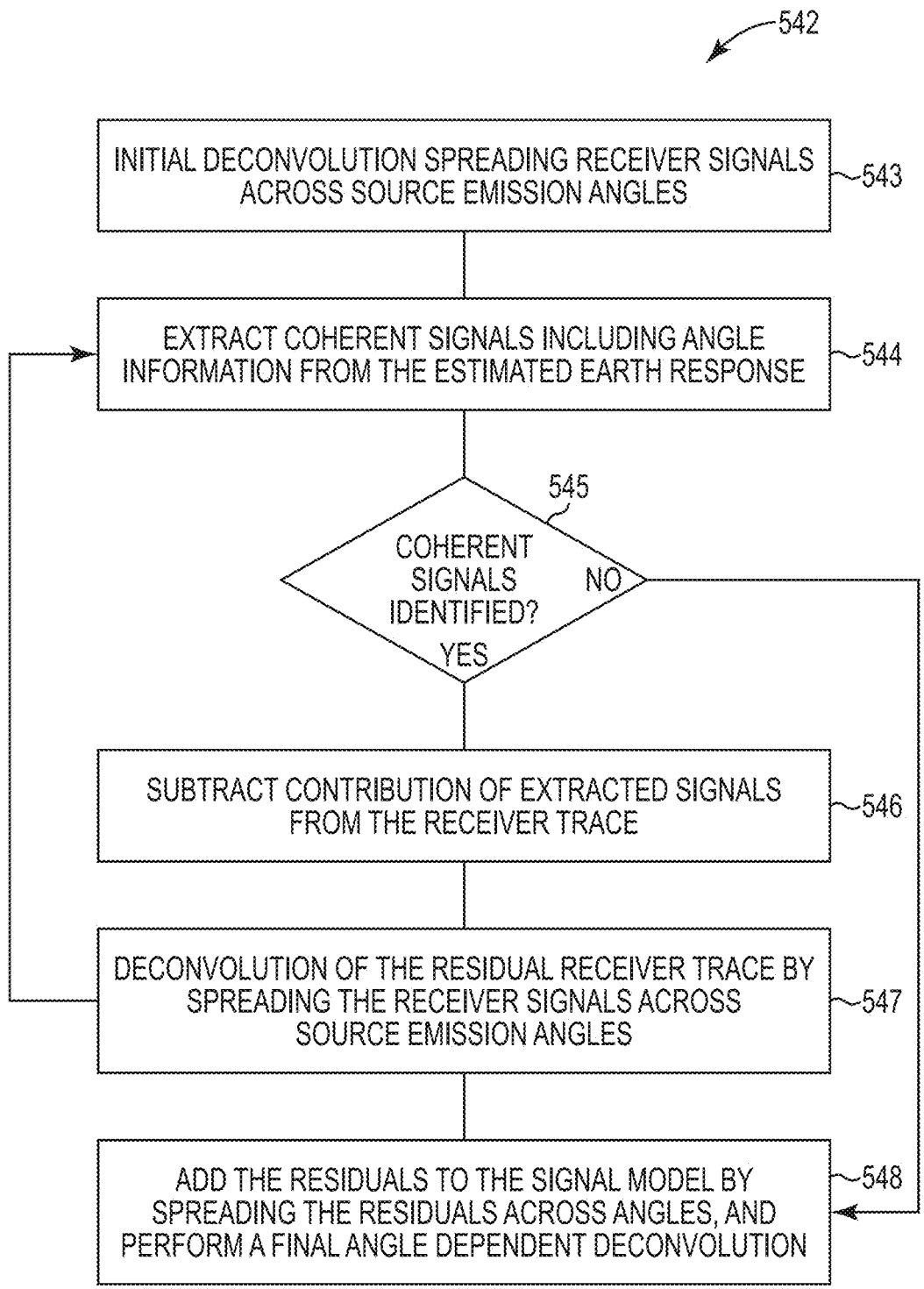
FIG. 5 illustrates a method flow diagram for estimating an earth response.

In at least one embodiment, an iterative process can be used where the source emission angles are retrieved by identifying and extracting coherent signals from the deconvolution result that fall within the possible source emission angle range. As used herein, a deconvolution result (or result of a deconvolution) includes data received and/or gathered as a result of the performance of the deconvolution. As used herein, coherent signals are signals that can be related to reflections, diffractions, and/or refractions from the subsurface that fall within possible emission angles. Such signals can be tracked across a spatial range. The contribution from the extracted coherent signals to the receiver trace can be calculated and subtracted from the receiver trace. As used herein, the contribution of the extracted coherent signals can include the part played by the extracted coherent signals in the receiver trace. The extracted coherent signals can be put into a signal model, and a receiver trace, referred to herein as a residual receiver trace, after subtraction of the extracted signals can be deconvolved in the same way as the first deconvolution since the source emission angles are not known for these residual signals. As used herein, a signal model is a portion of the earth response that has been extracted. Extraction can include collecting information from data, for instance, collecting coherent signals from a deconvolution result. A flow chart of an example of the iterative process is illustrated in FIG. 5. Outputs from this iterative process are illustrated in FIGS. 8-12.

As noted above, some prior approaches to deconvolving a source wavefield from a receiver wavefield in a multi-dimensional manner include sorting the seismic data into a common receiver gather as the input data. The source wavefield that is deconvolved from this common receiver gather can be a multi-dimensional source wavefield of the same dimensions. Such a deconvolution may be done in a least squares fashion as:

$$R(\omega, k_x^s, k_y^s) = D(\omega, k_x^s, k_y^s) \frac{\bar{S}(\omega, k_x^s, k_y^s)}{|S(\omega, k_x^s, k_y^s)|^2 + \varepsilon} \quad (1)$$

where $\omega$ is angular frequency, $k_x^s$ and $k_y^s$ are the horizontal wavenumber in the in-line and cross-line directions respectively, $R(\omega, k_x^s, k_y^s)$ is the common receiver gather after the source wave-field has been deconvolved, $D(\omega, k_x^s, k_y^s)$ is the input common receiver gather, and $S(\omega, k_x^s, k_y^s)$ is the source wavefield that is deconvolved from the common receiver gather. The superscript "s" means that it is referring to the source axis. Due to poor sampling cross-line, $k_y^s$ may be assumed to be zero. As such, the deconvolution can be performed in two dimensions. The source wavefield can be calculated analytically using the following equation:

$$S(\omega, k_x^s, k_y^s) = \Sigma_n N_n(\omega) e^{-i(k_x^s \Delta x_n + k_y^s \Delta y_n)} (e^{ik_z^s z_n} + re^{-ik_z^s z_n}) \quad (2)$$

where n is the number of source elements (such as air guns) in a source array, $N_n(\omega)$ is the notional source signature for source element n (the wavefield emitted by one point source), $\Delta x_n$ and $\Delta y_n$ are the x- and y-positions of source element n relative to the center of the source array, $z_n$ is the depth of source element n, and $k_z^s$ is the vertical wavenumber given by:

$$k_z^s = \sqrt{\left(\frac{\omega}{c}\right)^2 - k_x^{s2} - k_y^{s2}} \quad (3)$$

where c is the velocity of sound in water. This formulation is based on calculating the source wavefield and transforming the common receiver gather into the frequency wavenumber domain.

Alternative prior approaches include plane-wave decomposition methods such as linear Radon transforms transforming the data into the Tau-p domain. Prior approaches for a multi-dimensional deconvolution of a source wavefield may assume that each receiver trace in the common receiver gather is associated with only one actuation of the source array at a fixed time relative to time zero of the receiver trace, and that the source wavefield emitted in each firing of the source array is the same for all actuations contributing to the common receiver gather.

In contrast, at least one embodiment of the present disclosure utilizes near-continuous seismic recording. With the advent of near-continuous seismic recording, seismic data that have been recorded near-continuously can be gathered into one near-continuous seismic record. In the case of towed streamer seismic data where the streamers are constantly moving while recording, it may be desirable to correct for the receiver motion. This correction can be performed by applying the following operator to the data:

$$O(k_x^r, k_y^r, t) = e^{-i(k_x^r \Delta x_t + k_y^r \Delta y_t)} \quad (8)$$

where $k_x^r$ and $k_y^r$ are wavenumbers, and $\Delta x_t$ and $\Delta y_t$ are the distance the receiver has moved in the x- and y-directions respectively at time t relative to the start of the near-continuous recording. The superscript "r" means it is referring to the receiver axis. In response to this spatial correction as a function of time, the data can be organized such that each receiver trace represents data from one common receiver in a fixed position (e.g., stationary receiver position). Such a time variant spatial correction may not be needed for seismic data acquired with receivers located in stationary locations at the sea bottom because each receiver trace represents a receiver position as they are recorded. These receivers can include, for instance, nodes and/or ocean bottom cables, among others. The receiver data can be a pressure, particle motion, and/or an up-/down-going wavefield after wavefield separation. Each receiver trace in a stationary position can represent a point receiver that can receive signals from any direction emitted at any angle by the sources. As noted above, the example physical experiment is illustrated in FIG. 2. The signals recorded by the receiver trace can be expressed as follows:

$$P_r(\omega) = \Sigma_{k_x^s} \Sigma_{k_y^s} S_r(\omega, k_x^s, k_y^s) E(\omega, k_x^s, k_y^s) \quad (9)$$

where $S(\omega, k_x^s, k_y^s)$ is the total source wavefield contributing to the receiver location, and $E(\omega, k_x^s, k_y^s)$ is the earth response. Since the receiver trace contains signals that can be from any source emission angle, and hence the summation over all horizontal wavenumbers, this information is unknown.

Signals emitted from a plurality of sources over a time range can contribute to each receiver trace. Signals emitted from sources before the start time of the receiver trace can contribute. In at least one embodiment, signals emitted from sources in the order of 100 seconds before the start time can be included. Signals emitted from sources after the end time of the receiver trace may not contribute to the receiver trace. These principles can be used to determine the source wavefield contributing to a receiver trace. The source wavefield including all source elements contributing to a receiver trace can be calculated analytically using the following equation:

$$S_r(\omega, k_x^s, k_y^s) = \Sigma\Sigma S_n(t) e^{-i\omega t} e^{-i(k_x^s x_n(t) + k_y^s y_n(t))} (e^{ik_z^s z_n(t)} + re^{-ik_z^s z_n(t)}) \quad (10)$$

where $S_n(t)$ is the signal emitted by source element n (the wavefield emitted by one point source) at time t, $x_n(t)$ and $y_n(t)$ are the x- and y-positions of the source element at time t relative to the (x, y) position of the receiver trace, $z_n(t)$ is the depth of source element at time t, and r is the reflectivity of the sea surface. In order to derive the earth response, the source wavefield can be deconvolved from the receiver wavefield. The source wavefield as a function of source emission angle can be defined by equation (10), since the source emission angle and frequency-wavenumber are related through the equation:

$$\cos\theta_s = c\frac{k_z^s}{\omega}. \quad (11)$$

The source emission angle may not be known in the receiver trace since this is one point receiver that can receive signals from any angle. In order to retrieve the source emission angles that are in the receiver trace, an initial deconvolution can be performed by spreading the received signals across the source emission angles. This can be equivalent to using the same frequency spectrum of the receiver trace across all wavenumbers. This initial deconvolution can be expressed as:

$$\tilde{E}(\omega, k_x^s, k_y^s) = a(\omega)(P_r(\omega) \frac{\overline{S_r}(\omega, k_x^s, k_y^s)}{|S_r(\omega, k_x^s, k_y^s)|^2 + \varepsilon} \quad (12)$$

where $\Sigma(\omega, k_x^s, k_y^s)$ is the output common receiver gather with an estimated earth response, $a(\omega)$ is a user-defined output wavelet, $P_r(\omega)$ is an input receiver trace that is used across all wavenumbers, and $S_r(\omega, k_x^s, k_y^s)$ is the source wavefield contributing to the receiver trace. If the amplitude spectrum of the emitted source wavefield is close to constant across the wavenumbers, the initial deconvolution can alternatively be performed using a multi-dimensional phase correction and a one-dimensional amplitude correction as illustrated in the following equation:

$$\tilde{E}(\omega, k_x^s, k_y^s) \approx a(\omega)(P_r(\omega) \frac{e^{-i\varphi_{S_r}(\omega, k_x^s, k_y^s)}}{|S_r(\omega; k_x^s = 0, k_y^s = 0)|} \quad (13)$$

where $\varphi_{S_r}(\omega, k_x^s, k_y^s)$ is the phase angle of the source wavefield $S_r(\omega, k_x^s, k_y^s)$ as a function of angular frequency and horizontal wavenumbers, and $|S_r(\omega; k_x^s=0, k_y^s=0)|$ is the amplitude of the same source wavefield as a function of angular frequency at horizontal wavenumbers equal to zero. In other words, it is the amplitude spectrum at vertical source emission angle. Alternatively, the spectrum in the denominator can be the average amplitude across wavenumbers per frequency.

Figure 9:
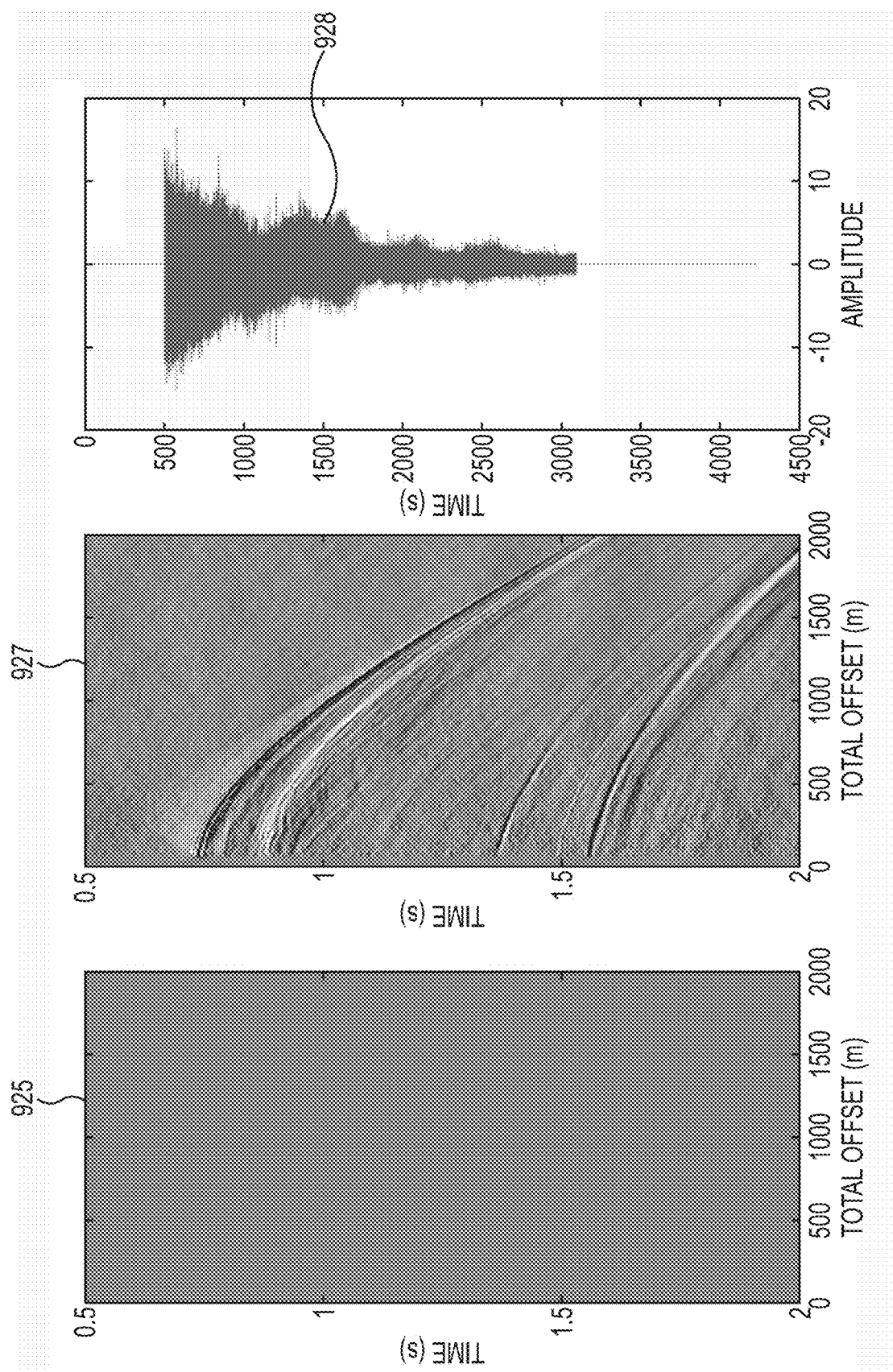
FIG. 9 illustrates a diagram of an example of a deconvolution of a source wavefield.

An example illustrating the process is shown in FIG. 9. Because the receiver wavefield is spread over the source emission angles, the correct source emission angles can be included in the deconvolution. However, errors can occur since incorrect source emission angles are included as well. At least one embodiment of the present disclosure can allow for the extraction of source emission angle information from the data via an iterative process. As used herein, source emission angle information can include the angle at which a source emitted a signal. This iterative process is illustrated in FIG. 5.

Figure 3:
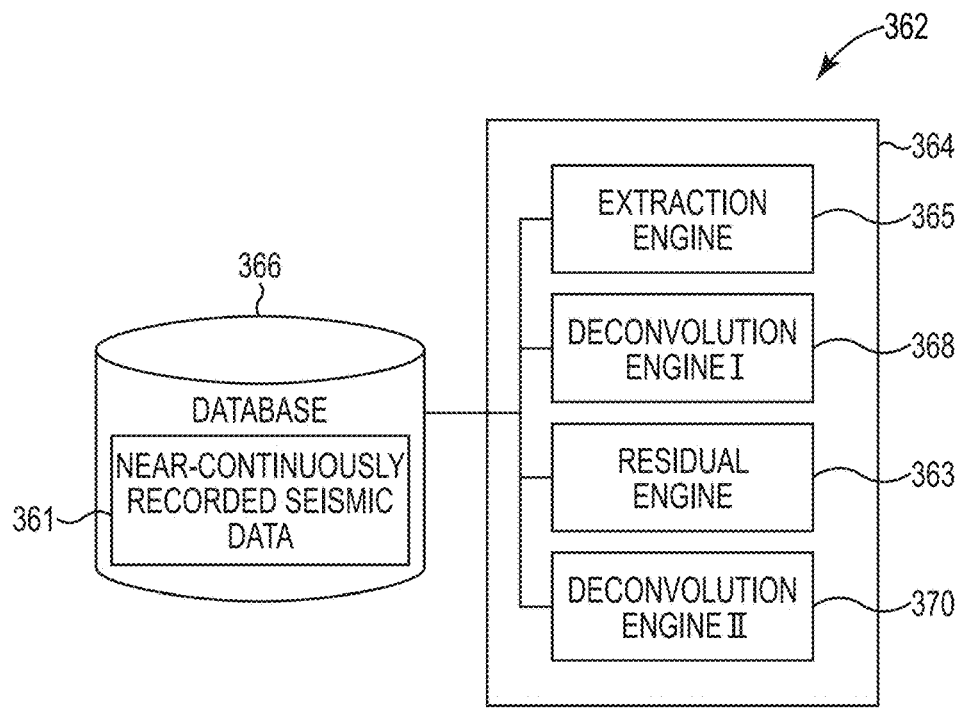
FIG. 3 illustrates a diagram of a system for estimating an earth response.

FIG. 3 illustrates a diagram of a system 362 for estimating an earth response. The system 362 can include a database 366, a subsystem 364, and/or a number of engines, such as an extraction engine 365, a first deconvolution engine 368, a residual engine 363, and/or a second deconvolution engine 370. The subsystem 364 and engines can be in communication with the database 366 via a communication link. The database can store near-continuously recorded seismic data 361. The near-continuously recorded seismic data 361 can be a result of multiple actuations occurring in a near-continuously, non-simultaneous manner. In at least one embodiment, rather than actuating an array of air guns simultaneously every 25 meters or 10 seconds, individual air guns can be actuated every 100-200 milliseconds.

The system 362 can include more or fewer engines than illustrated to perform the various functions described herein. The system can represent program instructions and/or hardware of a machine such as the machine 474 referenced in FIG. 4, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The extraction engine 365 can include a combination of hardware and program instructions that is configured to estimate an earth response by extracting coherent signals from a deconvolution of the near-continuously recorded seismic data iteratively until coherent signals are no longer extractable. As used herein, extractable includes having a threshold number of coherent signals available for extraction. For instance, coherent signals may be considered no longer extractable when the availability of coherent signals to extract drops below a particular threshold. The threshold can be set by an administrator, technology, etc. and can vary based on the method of extraction. The deconvolution of the near-continuously recorded seismic data can be based on a common receiver gather with the estimated earth response, and the common receiver gather can include the near-continuously recorded seismic data, the source wavefield, and an input receiver trace associated with the near-continuously recorded seismic data.

In at least one embodiment, the system 362 can also include a correction engine (not illustrated). The correction engine can include a combination of hardware and program instructions that is configured to deconvolve the near-continuously recorded seismic data using a multi-dimensional phase correction and a one-dimensional amplitude correction.

In at least one embodiment, because a plurality of source emission angles at which the near-continuously recorded seismic data was emitted can be unknown, the extraction engine 365 can include a combination of hardware and program instructions that is configured to determine this plurality of source emission angles via this iterative process. For instance, signals from the near-continuously received seismic data can be spread across a plurality of source emission angles, including in at least one embodiment spreading the signals across possible source emission angles. In at least one embodiment, the signals can be spread across all possible source emission angles. As used herein, possible source emission angles include angles at which a source may have emitted a particular signal. As used herein all possible source emission angles include all possible angles at which a source may have emitted a particular signal.

As used herein, spreading signals across a plurality of source emission angles can include using a receiver trace across a plurality of source emission angles, and converting the receiver trace into a common receiver gather consisting of a collection of traces that have all been received at the same receiver. The unknown source emission angles can be extracted from the common receiver gather. This conversion and extraction can occur in the iterative process discussed with respect to FIG. 5. A source wavefield can be deconvolved using this information, and a portion of the signal corresponding to a specific source emission angle can appear in the correct spot following the deconvolution. The remainder of the signal can generate noise.

Coherent signals can be extracted from data available following the deconvolution, and those signals can be convolved with the source wavefield to model a contribution of that signal to a receiver trace. That contribution can be subtracted from the receiver trace, which can generate a residual receiver trace. Once again, source emission angles of the near-continuously recorded seismic data are unknown, so the process of spreading the near-continuously recorded seismic data across possible source emission angles, deconvolving, extracting coherent signals, deconvolving, and subtracting can be repeated until coherent signals are no longer extractable from residual receiver traces.

The first deconvolution engine 368 can include a combination of hardware and program instructions that is configured to calculate, in response to the coherent signals no longer being extractable, an angle-dependent receiver wavefield by deconvolving a source wavefield associated with the near-continuously recorded seismic data with the extracted coherent signals. The receiver wavefield is an angle-dependent receiver wavefield because it is dependent on the now-known source emission angles. The residual engine 363 can include a combination of hardware and program instructions that is configured to spread a residual receiver trace across a first plurality of source emission angles and add the residual receiver trace to a receiver wavefield associated with a receiver that recorded the near-continuously recorded seismic data. In at least one embodiment, the first plurality of source emission angles comprises possible source emission angles. The second deconvolution engine 370 can include a combination of hardware and program instructions that is configured to update the earth response estimate by performing a source emission angle-dependent deconvolution of the source wavefield from the receiver wavefield.

Figure 4:
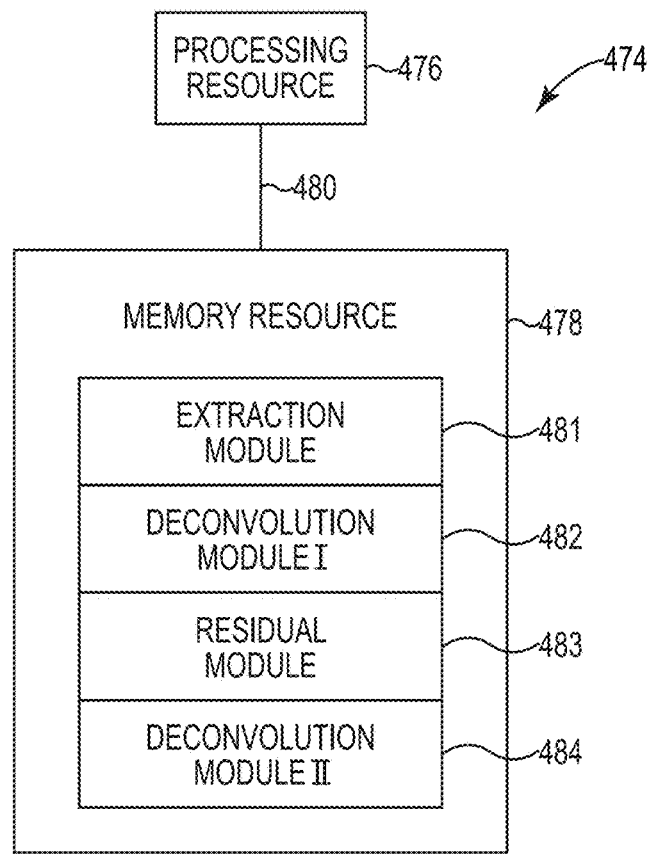
FIG. 4 illustrates a diagram of a machine for estimating an earth response.

FIG. 4 illustrates a diagram of a machine 474 for estimating an earth response. The machine 474 can utilize software, hardware, firmware, and/or logic to perform a number of functions. The machine 474 can be a combination of hardware and program instructions configured to perform a number of functions and/or actions. The hardware, for example, can include a number of processing resources 476 and a number of memory resources 478, such as a machine-readable medium or other non-transitory memory resources 478. The memory resources 478 can be internal and/or external to the machine 474, for example, the machine 474 can include internal memory resources and have access to external memory resources. The program instructions, such as machine-readable instructions, can include instructions stored on the machine-readable medium to implement a particular function. The set of machine-readable instructions can be executable by one or more of the processing resources 476. The memory resources 478 can be coupled to the machine 474 in a wired and/or wireless manner. For example, the memory resources 478 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 478 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 476 can be coupled to the memory resources 478 via a communication path 480. The communication path 480 can be local or remote to the machine 474. Examples of a local communication path 480 can include an electronic bus internal to a machine, where the memory resources 478 are in communication with the processing resources 476 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 480 can be such that the memory resources 478 are remote from the processing resources 476, such as in a network connection between the memory resources 478 and the processing resources 476. That is, the communication path 480 can be a network connection. Examples of such a network connection can include a local area network, wide area network, personal area network, and the Internet, among others.

As shown in FIG. 4, the machine-readable instructions stored in the memory resources 478 can be segmented into a number of modules 481, 482, 483, and/or 484 that when executed by the processing resources 476 can perform a number of functions. As used herein a module includes a set of instructions included to perform a particular task or action. The number of modules 481, 482, 483, and/or 484 can be sub-modules of other modules. For example, the first deconvolution module 482, residual module 483, and second deconvolution module 484 can be sub-modules of the extraction module 481. Furthermore, the number of modules 481, 482, 483, and/or 484 can comprise individual modules separate and distinct from one another. Examples are not limited to the specific modules 481, 482, 483, and/or 484 illustrated in FIG. 4.

Each of the number of modules 481, 482, 483, and/or 484 can include program instructions and/or a combination of hardware and program instructions that, when executed by a processing resource 476, can function as a corresponding engine as described with respect to FIG. 3. For example, the extraction module 481 can include program instructions and/or a combination of hardware and program instructions that, when executed by a processing resource 476, can function as the extraction engine 365, the first deconvolution module 482 can include program instructions and/or a combination of hardware and program instructions that, when executed by a processing resource 476, can function as the first deconvolution engine 368, the residual module 483 can include program instructions and/or a combination of hardware and program instructions that, when executed by a processing resource 476, can function as the residual engine 363, and/or the second deconvolution module 484 can include program instructions and/or a combination of hardware and program instructions that, when executed by a processing resource 476, can function as the second deconvolution engine 370.

In accordance with a number of embodiments of the present disclosure, a geophysical data product can be produced and/or manufactured. The geophysical data product can include, for example, a marine survey measurement with an estimated earth response. Geophysical data can be obtained and stored on a non-transitory, tangible machine-readable medium. The geophysical data product can be produced by processing the geophysical data offshore or onshore either within the United States or in another country. If the geophysical data product is produced offshore or in another country, it can be imported onshore to a facility in the United States. In some instances, once onshore in the United States, geophysical analysis can be performed on the geophysical data product. In some instances, geophysical analysis can be performed on the geophysical data product offshore.

In at least one embodiment, processing the geophysical data to generate the geophysical data product can include estimating an earth response by deconvolving a multi-dimensional source wavefield from near-continuously recorded seismic data recorded at a receiver position. The deconvolving can include spreading the near-continuously recorded seismic data across a first plurality of possible source emission angles. A first result of the deconvolution can be used as the earth response estimate.

FIGS. 5-8 illustrate method flow diagrams for estimating an earth response. FIG. 5 illustrates a method flow diagram 542 including an iterative process to extract angle information from near-continuously recorded seismic data. At least one embodiment of the present disclosure can allow for the extraction of source emission angle information from the data including the iterative process illustrated in FIG. 5. In response to an initial deconvolution spreading receiver signals across the source emission angles at 543, coherent signals can be extracted from the initial deconvolution result at 544. These coherent signals can contain source emission angle information due to the coherency of the signals and from an estimated earth response.

A contribution from these extracted signals to the receiver trace can be determined by convolving with the source wavefield using equation (9) replacing the earth response with the extracted coherent signals. The derived contribution to the receiver trace of the extracted coherent signals can be subtracted from the receiver trace at 546. The residual receiver trace can contain signals with unknown source emission angles. A deconvolution of the source wavefield according to equation (11) or equation (12) can be performed by using the residual receiver trace across a plurality of source emission angles. For example, a deconvolution of the residual receiver trace can include spreading the receiver signals across possible source emission angles at 547. The result may not contain the errors generated by the coherent signals that have been extracted in the previous stages illustrated in diagram 542, and more coherent signals can appear in the deconvolution result.

At 548, coherent signals from the deconvolution result can be extracted and added to the signal model. For instance, the residuals can be added to the signal model by spreading the residuals across possible source emission angles, and a final angle-dependent deconvolution can be performed. These stages can be repeated until coherent signals are no longer extractable. For example, at 545, a determination of whether coherent signals are identifiable and/or extractable can be made. If coherent signals are identifiable and/or extractable, the iterative process continues at 546. If no coherent signals are identifiable and/or extractable the process proceeds to the addition of the residuals to the signal model at 548. For example, when coherent signals can no longer be extracted from the residuals, the angle-dependent receiver wavefield can be calculated by convolving the source wavefield with the extracted signals (estimated earth response), the contribution to the recorded receiver trace can be calculated and subtracted from the original receiver trace to calculate a residual receiver trace. That residual receiver trace can be spread across possible source emission angles, and the source wavefield can be deconvolved. The resulting receiver gather can be added to the already extracted coherent signals.

Figure 6:
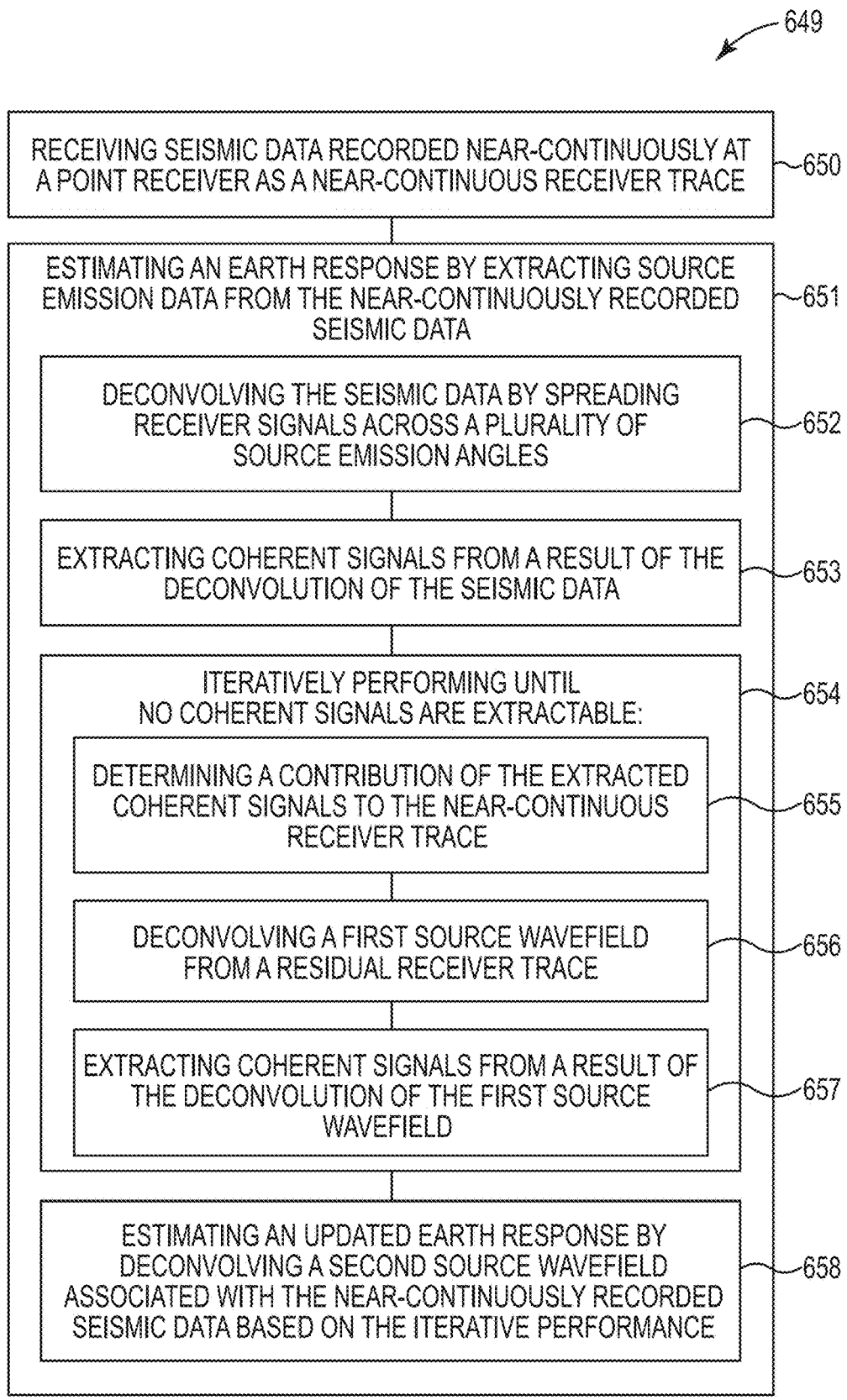
FIG. 6 illustrates a method flow diagram for estimating an earth response.

FIG. 6 illustrates a method flow diagram 649 for estimating an earth response. At 650, seismic data recorded near-continuously at a point receiver as a near-continuous receiver trace is received. The near-continuously recorded data can be recorded at a single stationary point on the surface, but it can be emitted by a plurality of sources moving with a vessel. For instance, sources on a six kilometer streamer can act like a single six kilometer source that takes a particular amount of time to move. Using that particular time range, a receiver trace can be generated, which can be converted into a common receiver gather consisting of a collection of receiver traces that have all been received at the same receiver. The unknown source emission angles can be extracted from the common receiver gather. This conversion and extraction can occur, for example, in the iterative process discussed with respect to FIG. 5.

In at least one embodiment, the method can include correcting for motion of the point receiver as a function of time based on a distance the point receiver moved relative to a start of the near-continuous recording of the seismic data. At 651, source emission data from the near-continuously recorded seismic data is extracted. As used herein, source emission data includes information about the emission of a signal from a source. The information can include, for instance, source emission angle information, timing information, and distance information.

At 652, the extraction can include deconvolving the near-continuously recorded seismic data by spreading receiver signals across a first plurality of source emission angles. In at least one embodiment, the first plurality of source emission angles can include possible source emission angles.

Also as part of the extraction, at 653, coherent signals are extracted from a result of the deconvolution of the seismic data. Extracting coherent signals can include prioritizing extraction of the coherent signals based on an energy of the coherent signals or prioritizing coherent signals falling along hyperbolic trajectories within a specified velocity range. In at least one embodiment, extracting coherent signals includes identifying and suppressing incoherent signals.

At 654, as part of the extraction and as noted above, an iterative process is performed. The iterative process includes, at 655, determining a contribution of the extracted coherent signals to the near-continuous receiver trace. Signals emitted from sources over a particular time range can contribute to a receiver trace, but signals emitted from sources after the end time of the receiver trace may not contribute to the receiver trace. Determining the contribution of the extracted coherent signals can include convolving the extracted coherent signals with the source wavefield using equation (9). The earth response can be replaced, in at least one embodiment, with the extracted coherent signals. The determined contribution to the receiver trace can be subtracted from the receiver trace resulting in a residual receiver trace.

The iterative process includes, at 656, deconvolving a source wavefield from a residual receiver trace and, at 657, extracting coherent signals from the deconvolution result, and iterating the stages 655 to 657 until no coherent signals are extractable, for instance as part of the iterative process performed at 654. The residual receiver trace can contain signals with unknown source emission angles. A deconvolution of the source wavefield using equation (11) or (12) can be performed using a residual receiver trace across a plurality of source emission angles and may not include errors generated by the extracted coherent signals. Additional coherent signals can appear in the deconvolution result. Coherent signals present in the deconvolution results can be extracted from the deconvolution result and added to a signal model. The iterative process can be performed repeatedly until coherent signals are no longer extractable.

At 658, the method includes deconvolving a source wavefield associated with the near-continuously recorded seismic data based on the iterative performance. For example, when coherent signals are no longer extractable, a receiver wavefield can be calculated by convolving the source wavefield with the extracted coherent signals and subtracting these contributions from the original receiver trace. The residual receiver trace can be spread across possible source emission angles, the source wavefield can be deconvolved, and the resulting receiver gather can be added to the extracted signals.

Figure 7:
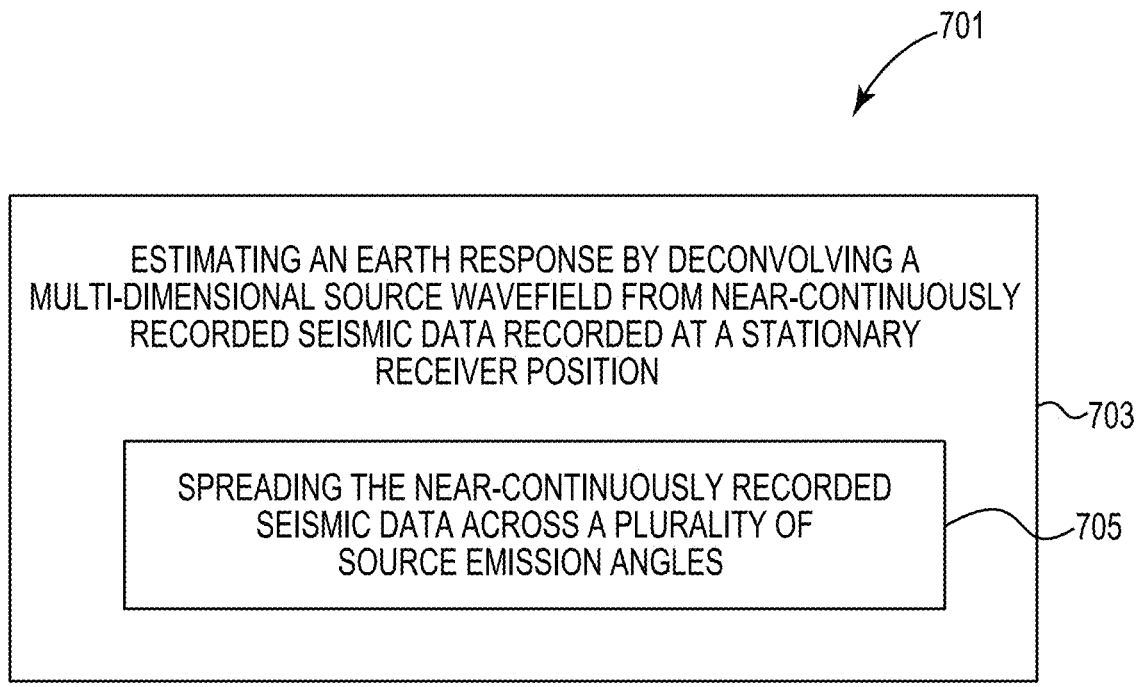
FIG. 7 illustrates a method flow diagram for estimating an earth response.

FIG. 7 illustrates a method flow diagram 701 for estimating an earth response. At 703, an earth response can be estimated by deconvolving a multi-dimensional source wavefield from near-continuously recorded seismic data recorded at a receiver position. At 705, the deconvolving can include spreading the near-continuously recorded seismic data across a first plurality of possible source emission angles. The first plurality of possible source emission angles can include possible source emission angles, for example.

Estimating the earth response, in at least one embodiment can include extracting a first set of coherent signals from the result of the deconvolution, which in at least one embodiment is the earth response estimate, and using the first set of coherent signals as an additional earth response estimate. For instance, the coherent signals can be added to the earth response estimate, or the coherent signals can be used alone as the earth response estimate. The extraction of coherent signals can be done in a plurality of ways. One example can include extracting signals falling along hyperbolic trajectories within a specified velocity range. Such hyperbolic events can be identified using an automated semblance analysis. The hyperbolic events can then be extracted by filtering out signals that do not follow the identified hyperbolic events. Another method for extracting coherent signals can include extracting energetic events both in time-space and after a plane-wave decomposition. For example, a most energetic event may be extracted in time-space and after the plane-wave decomposition. The extraction after plane-wave decomposition can be limited to a signal cone. Another method for extracting coherent signals from the residuals includes identifying and suppressing incoherent signals. This can include f-x prediction filtering. Other methods can be used in combination to extract coherent signals including source emission angle information. As would be understood by one of ordinary skill in the art with the benefit of this disclosure, other coherent signal extraction methods not mentioned here can be used.

In at least one embodiment, estimating the earth response can include determining a contribution of the earth response estimate and/or the additional earth response estimate to the near-continuously recorded seismic data recorded at a receiver position and subtracting the contribution from the near-continuously recorded seismic data. As used herein, the contribution of the earth response estimate and/or the additional earth response estimate can include the part played by the earth response estimate and/or the additional earth response estimate in the near-continuously recorded seismic data. In response to the subtracting, estimating the earth response can include generating a different deconvolution result by deconvolving the source wavefield from remaining near-continuously recorded seismic data spread across a different plurality of source emission angles, extracting a different set of coherent signals from the different deconvolution result, and adding the different set of coherent signals to the earth response estimate and/or the additional earth response estimate. Remaining near-continuously recorded seismic data can include near-continuously recorded seismic data left following the subtraction. In at least one embodiment, the different plurality of possible source emission angles can include source emission angles possible subsequent to the subtraction.

A result of the deconvolution can be used as the earth response estimate. The method can also include, in at least one embodiment, iteratively performing the determining of the contribution of the earth response estimate and/or the additional earth response, the subtracting of the contribution from the near-continuously recorded seismic data, the generating of the different deconvolution result, the extracting of the different set of coherent signals, and the adding of the different set of coherent signals to the earth response estimate and/or the additional earth response estimate.

Figure 8:
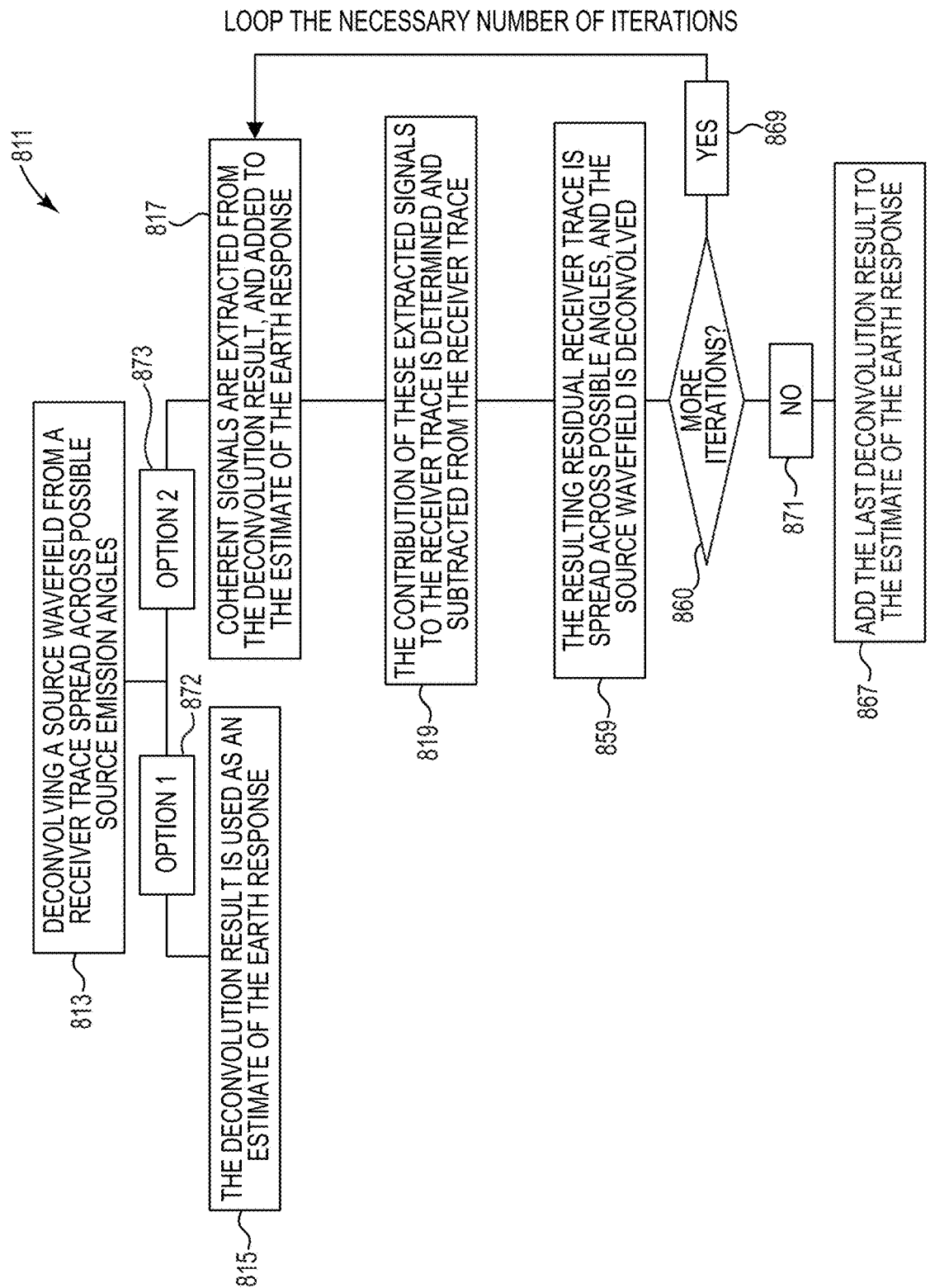
FIG. 8 illustrates a method flow diagram for estimating an earth response.

FIG. 8 illustrates a method flow diagram 811 for estimating an earth response. At 813, a source wavefield can be deconvolved from a receiver trace spread across possible source emission angles. In at least one embodiment, two options may be exercised in response. For instance, option 1 at 872 can include using the deconvolution result as an earth response estimate. In another example, option 2 at 873 can include an iterative process. For instance, at 817, coherent signals can be extracted from a deconvolution result, and the extracted signals can be added to an earth response estimate. The earth response estimate can be the deconvolution result, as illustrated at 815. At 819, a contribution of the extracted signals to the receiver trace can be determined and subtracted from the receiver trace. In response, a resulting residual trace can be spread across possible source emission angles, and the source wavefield can be deconvolved at 859.

A portion of the method, including portions 817 to 819 to 859 can be performed iteratively. For instance, at 860, a determination can be made if more iterations are desired and/or necessary to extract further coherent signals. If it is determined at 871 that more iterations are not necessary, the last deconvolution result can be added to the earth response estimate at 867. If, at 869, it is determined more iterations are desired and/or necessary, method portions 817, 819, and 859 can be repeated the desired and/or necessary number of times, until it is determined at 871 that no more iterations are to be performed. At 867, the last deconvolution result can be added to the earth response estimate, resulting in an updated earth response estimate.

FIG. 9 illustrates a diagram of an example of a deconvolution of a source wavefield. For instance, FIG. 9 illustrates an initial deconvolution. A receiver trace is illustrated at 928. Receiver trace 928 includes near-continuously recorded seismic data. The data is recorded at a receiver position used to deconvolve the source wavefield. Receiver gather 927 illustrates a result of a deconvolution of the receiver trace 928. The deconvolution can include spreading receiver signals across possible source emission angles. Receiver trace 928 includes noise because possible source emission angles are included. Window 925 includes what has been extracted. However, in the example illustrated in FIG. 9, no extraction has occurred, only deconvolution has occurred. The term "window" as used herein, is used to represent a common receiver gather.

Figure 10:
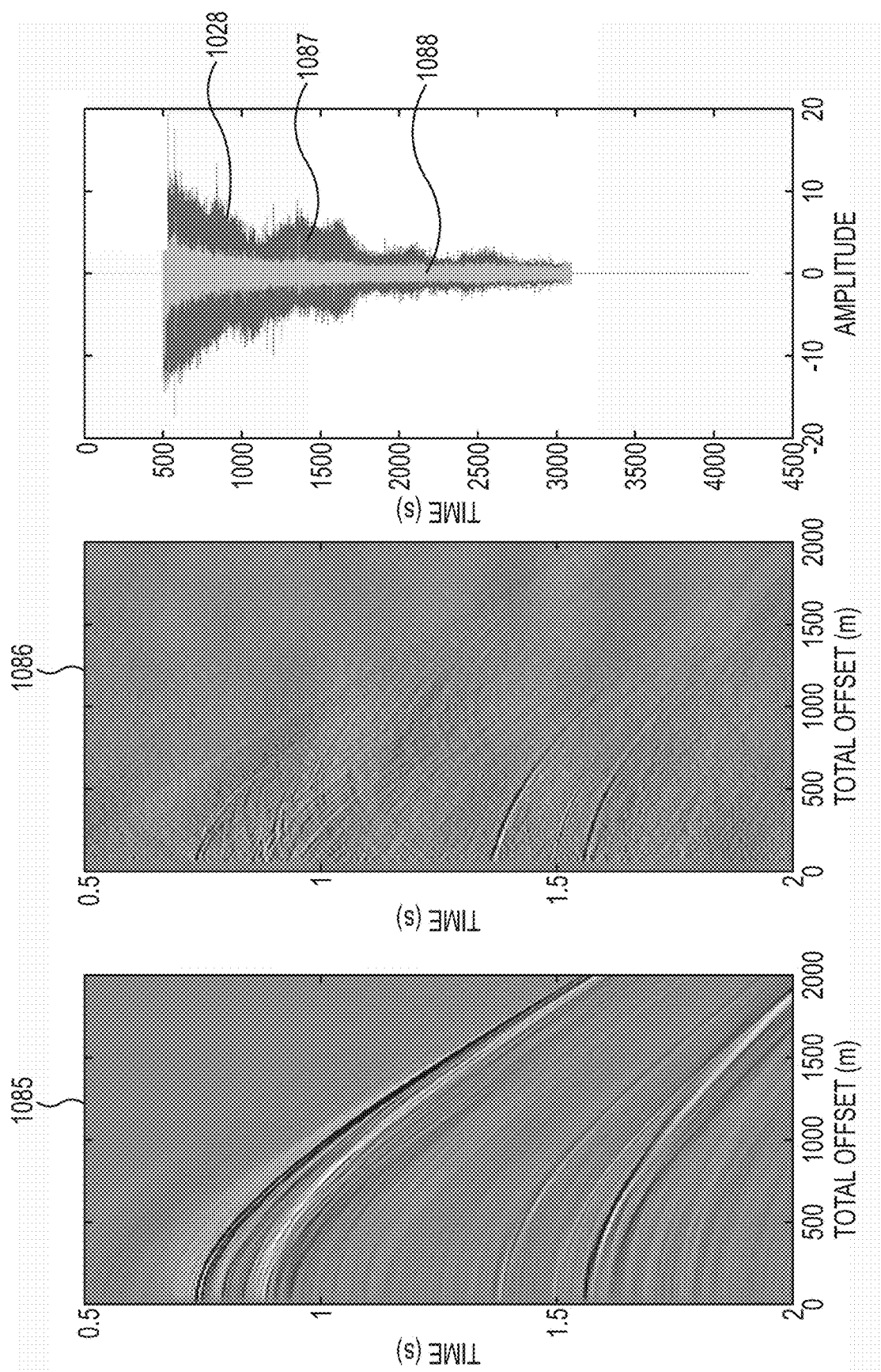
FIG. 10 illustrates a diagram of an example of event extraction associated with estimating an earth response.
Figure 11:
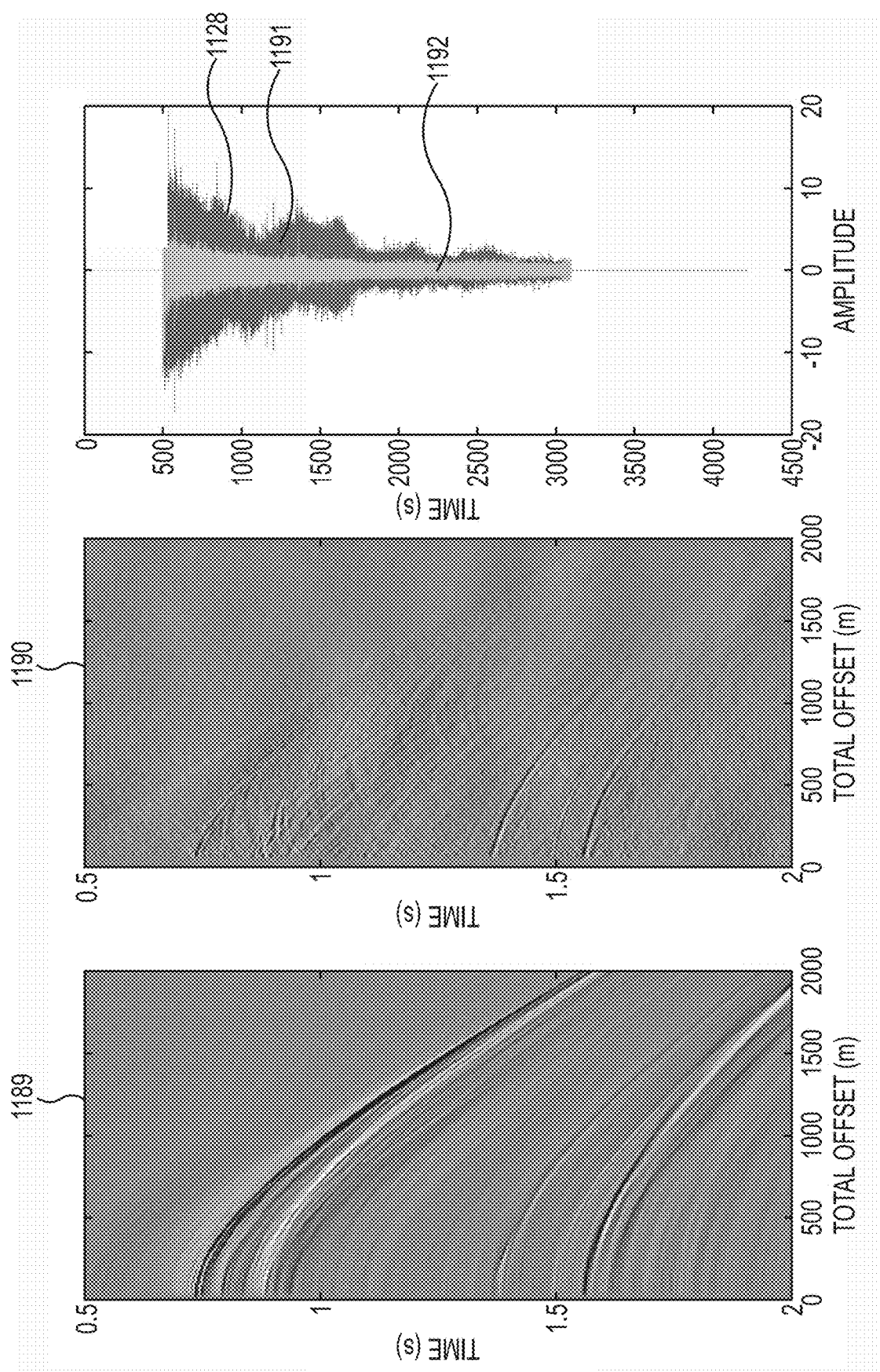
FIG. 11 illustrates a diagram of an example of event extraction associated with estimating an earth response.
Figure 12:
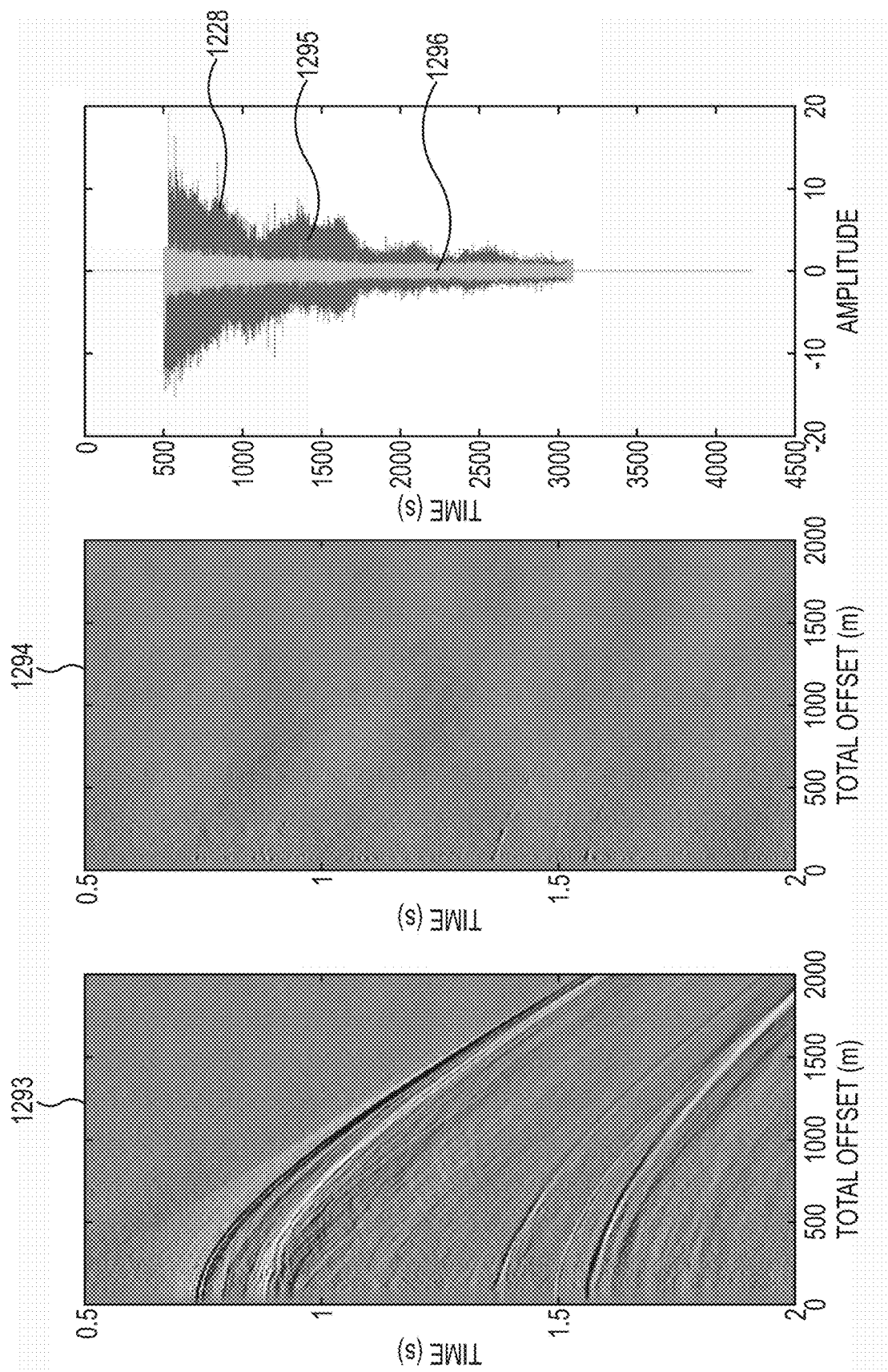
FIG. 12 illustrates a diagram of an example of event extraction associated with estimating an earth response.

FIGS. 10-12 illustrate diagrams of an example of event extraction associated with deconvolution of a source wavefield. For instance, FIGS. 10-12 are associated with the iterative process illustrated in FIG. 5.

FIG. 10 illustrates a diagram of an example of event extraction subsequent to the initial deconvolution illustrated in FIG. 9. In at least one embodiment, hyperbolas are extracted from the initial deconvolution, and their contributions to the receiver trace are subtracted from a recorded receiver trace 1028. For example, coherent signals that follow a hyperbolic curve are extracted. Window 1085 illustrates the extracted coherent signals, which can be convolved with the source wavefield, forming the predicted receiver trace 1087. Predicted receiver trace 1087 can be derived by deconvolving the source wavefield with the extracted coherent signals and summing over possible angles. Because in this example a large amount of coherent signals have been extracted, the predicted receiver trace 1087 is similar in size to the recorded receiver trace 1028, but it is not the same size because not all signals have been extracted. The difference between the receiver traces 1028 and 1087 constitutes residual receiver trace 1088.

The residual receiver trace 1088 can be deconvolved, and this deconvolution is illustrated in window 1086. Less noise is present in window 1086 as compared to window 927 of FIG. 9 because fewer coherent signals were deconvolved.

FIG. 11 illustrates a diagram of an example of event extraction subsequent to the extraction illustrated in FIG. 10. In at least one embodiment, the most energetic coherent signals are extracted from the deconvolution illustrated in FIG. 10. The most energetic coherent signals include coherent signals having the highest amplitudes associated with a time-space domain and/or a frequency wavenumber domain. The contributions of the extracted most energetic coherent signals can be subtracted from recorded receiver trace 1128. Window 1189 illustrates the extracted coherent signals, which can be convolved with the source wavefield, forming the predicted receiver trace 1191. Predicted receiver trace 1191 can be derived by deconvolving the source wavefield with the extracted coherent signals and summing over possible source emission angles. Subtracting predicted receiver trace 1191 from recorded receiver trace 1128 results in residual receiver trace 1192, which can be deconvolved in an attempt to extract more coherent data. The result of the deconvolution of residual receiver trace 1192 is illustrated in window 1190.

FIG. 12 illustrates a diagram of an example of event extraction subsequent to the extraction illustrated in FIG. 11. In the example illustrated in FIG. 12, it can be assumed that the noise level has been reduced to a point of extracting whatever signals are left. For instance, signals may or may not be coherent. The signals in a particular time window can be extracted, and thresholding and/or a frequency base number can be applied to the signals. These extracted signals are illustrated in window 1293. The contributions of the extracted signals can be subtracted from recorded receiver trace 1228. Window 1289 illustrates the extracted signals, which can be convolved with the source wavefield, forming the predicted receiver trace 1295. Predicted receiver trace 1295 can be derived by deconvolving the source wavefield with the extracted coherent signals and summing over possible angles. Subtracting predicted receiver trace 1295 from recorded receiver trace 1228 results in residual receiver trace 1296, which is comparatively smaller to residual receiver traces 1088 and 1192 illustrated in FIGS. 9 and 10.

Residual receiver trace 1296 can be deconvolved, and the result of the deconvolution of residual receiver trace 1296 is illustrated in window 1294.

In this example, very little energy is left, with only a few isolated events present in window 1294. Because few or no coherent signals are extractable at this point, the signal is added to the receiver wavefield, and an angle-dependent deconvolution of the source wavefield from the receiver wavefield can be performed.

Figure 13:
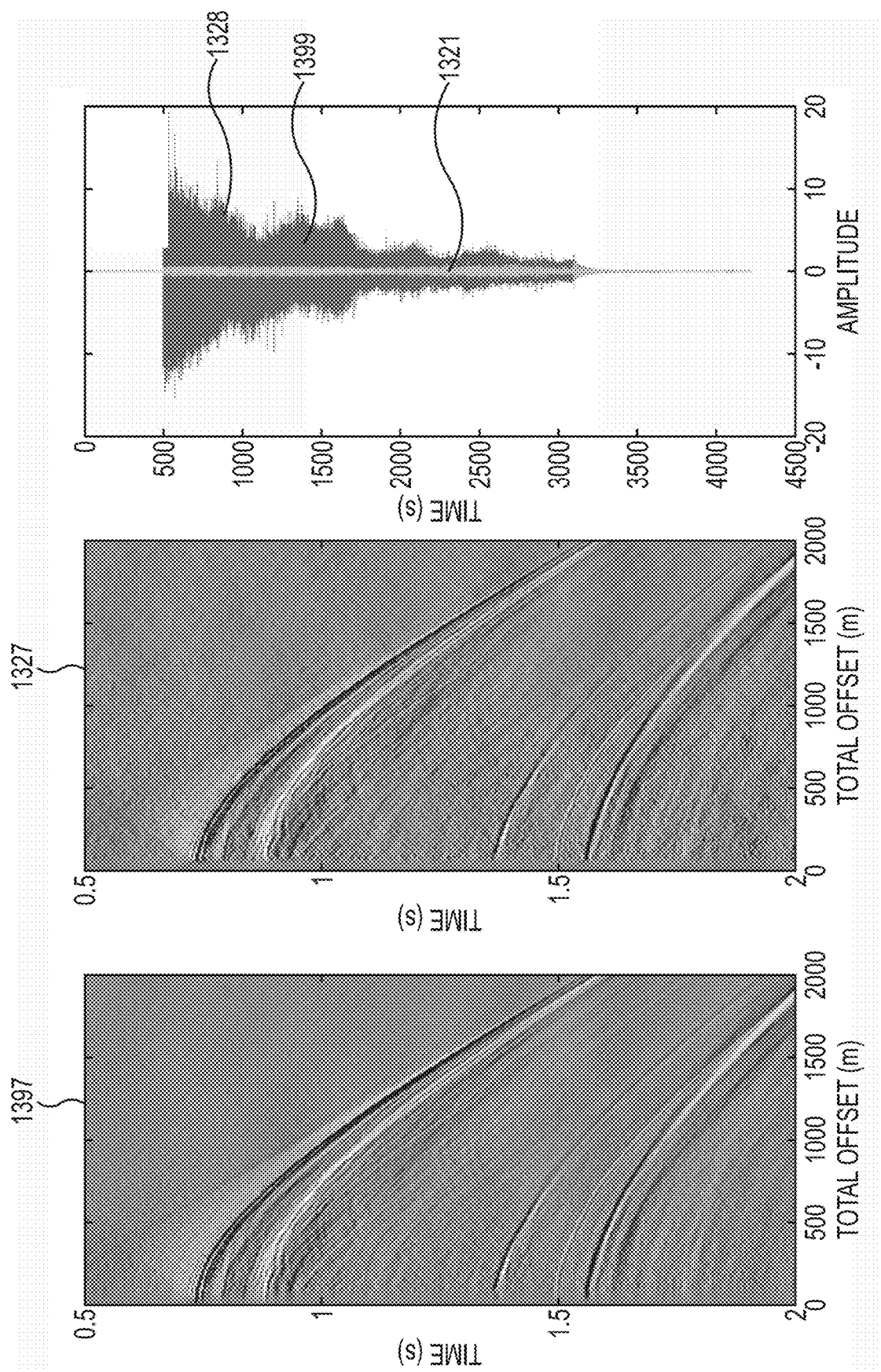
FIG. 13 illustrates a diagram of an example of a result of event extraction associated with estimating an earth response.

FIG. 13 illustrates a diagram of an example of a result of event extraction associated with deconvolution of a source wavefield. Window 1397 illustrates the result of the angle-dependent deconvolution discussed with respect to FIG. 12. The residual receiver trace 1296 of FIG. 12 is added to the signal model, a receiver trace 1399 is predicted again, and a new residual receiver trace is formed at 1321 as a result of a subtraction of predicted receiver trace 1399 from recorded receiver trace 1328. Residual receiver trace information is put into the signal model before the final angle-dependent source deconvolution is performed. A comparison to the initial deconvolution shown in window 1327 (see also window 927 of FIG. 9) to the final result in window 1397 illustrates that the final result has less isolated dotted noise as compared to the initial deconvolution. The noise is removed during the iterative deconvolution process.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments can provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. In a computer-implemented process for generating an image of a subterranean formation based at least in part on an estimated earth response, wherein the process uses receiver traces that were recorded continuously or near continuously over a time interval during a marine seismic survey, the specific improvement of performing computer-implemented steps comprising:
  obtaining or generating a point receiver trace from the receiver traces such that the point receiver trace corresponds to one-dimensional data as if produced by a single receiver located in a fixed spatial position responsive to energy reaching the single receiver over the time interval from multiple angles of incidence, the point receiver trace representing a receiver wavefield; and accumulating a final earth response estimate based at least in part on the receiver wavefield by iteratively:
generating an intermediate earth response estimate by deconvolving a source wavefield from the receiver wavefield, wherein the deconvolving spreads the receiver wavefield across a plurality of angles associated with the source wavefield;
extracting coherent energy from the intermediate earth response estimate;
adding the extracted coherent energy to the final earth response estimate; and
refining the receiver wavefield by removing contributions from the receiver wavefield that correspond to the extracted coherent energy; and using the final earth response estimate as the estimated earth response in the process for generating the image, thereby improving the image by improving the quality of the estimated earth response.

2. A process according to claim 1, wherein:
extracting coherent energy from the intermediate earth response identifies one or more angles of coherence; and
the one or more angles of coherence are used to determine the contributions to the receiver wavefield that correspond to the extracted coherent energy.

3. A process according to claim 1, further comprising:
stopping the iterations when the extracted coherent energy falls below a threshold level of energy.

4. A process according to claim 3, further comprising:
after a last iteration, adding the intermediate earth response estimate to the final earth response estimate.

5. A process according to claim 1, wherein:
the receiver traces correspond to traces from receivers that were disposed in towed streamers during the survey.

6. A process according to claim 1, wherein:
the receiver traces correspond to traces from receivers that were disposed in ocean bottom nodes during the survey.

7. A process according to claim 1, wherein:
the deconvolving is performed in a frequency-wavenumber domain and applies a same frequency spectrum of the receiver wavefield across all wavenumbers of the source wavefield.

8. A process according to claim 7, wherein:
the receiver wavefield is represented as a vector that contains one complex number for each of a plurality of angular frequencies;
the source wavefield is represented as a matrix that contains one vector of wavenumbers for each of the plural angular frequencies; and
the deconvolving comprises multiplying, for each of the plural angular frequencies, the one corresponding complex number in the receiver wavefield by the one corresponding vector of wavenumbers in the source wavefield.

9. A process according to claim 7, wherein:
the deconvolving comprises performing a multidimensional phase correction and a one-dimensional amplitude correction.

10. A process according to claim 1, wherein:
extracting the coherent energy comprises using automated semblance analysis to identify hyperbolic events.

11. A process according to claim 1, wherein:
extracting the coherent energy comprises extracting energetic events after a plane wave decomposition.

12. A process according to claim 1, wherein:
extracting the coherent energy comprises identifying and suppressing incoherent signals.

13. A process according to claim 12, wherein:
identifying and suppressing the incoherent signals comprises using f-x prediction filtering.

14. A process according to claim 1, wherein:
the source wavefield comprises signals that were emitted by impulsive sources during the survey.

15. A process according to claim 1, wherein:
the source wavefield comprises signals that were emitted by non-impulsive sources during the survey.

16. A tangible, non-volatile, computer readable medium containing instructions that, when executed by one or more processors of a computing device, cause the computing device to perform a method for generating an image of a subterranean formation based at least in part on a final earth response estimate, wherein the process uses receiver traces that were recorded continuously or near continuously over a time interval during a marine seismic survey, the method comprising:
obtaining or generating a point receiver trace from the receiver traces such that the point receiver trace corresponds to one-dimensional data as if produced by a single receiver located in a fixed spatial position responsive to energy reaching the single receiver over the time interval from multiple angles of incidence, the point receiver trace representing a receiver wavefield;
accumulating a final earth response estimate based at least in part on the receiver wavefield by iteratively:
generating an intermediate earth response estimate by deconvolving a source wavefield from the receiver wavefield, wherein the deconvolving spreads the receiver wavefield across a plurality of angles associated with the source wavefield;
extracting coherent energy from the intermediate earth response estimate;
adding the extracted coherent energy to the final earth response estimate; and
refining the receiver wavefield by removing contributions from the receiver wavefield that correspond to the extracted coherent energy.

17. A medium according to claim 16, wherein iteratively accumulating the final earth response comprises:
starting with a residual receiver wavefield equal to the point receiver trace; and
iteratively building the final earth response estimate by performing the following steps:
A) generating the intermediate earth response by deconvolving the source wavefield from the residual receiver wavefield, wherein the deconvolving is performed by spreading the residual receiver wavefield across all angles corresponding to the source wavefield;
B) extracting coherent energy from the intermediate earth response to determine coherent earth response components and one or more associated angles of coherence; and
if energy represented by the coherent earth response components exceeds a threshold:
C) updating the final earth response estimate to include the coherent earth response components;
D) generating a receiver contribution by convolving the coherent earth response components with the source wavefield, wherein the convolving is performed by using only the angles of coherence;

E) re-generating the residual receiver wavefield by subtracting the receiver contribution from the point receiver trace; and F) resuming at step A.

18. A medium according to claim 17, wherein the method further comprises:
if energy represented by the coherent earth response components does not exceed the threshold, updating the final earth response estimate to include the intermediate earth response.

19. A method of manufacturing a geophysical data product, comprising:
causing a computing device to perform a method for generating an image of a subterranean formation and storing the image, or a representation thereof, in a tangible, non-volatile, computer readable medium, thereby completing the manufacture of the geophysical data product, wherein the method for generating the image comprises:
obtaining or generating a point receiver trace from receiver traces that were recorded continuously or near continuously over a time interval during a marine seismic survey, such that the point receiver trace corresponds to one-dimensional data as if produced by a single receiver located in a fixed spatial position responsive to energy reaching the single receiver over the time interval from multiple angles of incidence, the point receiver trace representing a receiver wavefield;
accumulating a final earth response estimate based at least in part on the receiver wavefield by iteratively:
generating an intermediate earth response estimate by deconvolving a source wavefield from the receiver wavefield, wherein the deconvolving spreads the receiver wavefield across a plurality of angles associated with the source wavefield;
extracting coherent energy from the intermediate earth response estimate;
adding the extracted coherent energy to the final earth response estimate; and
refining the receiver wavefield by removing contributions from the receiver wavefield that correspond to the extracted coherent energy; and
using the final earth response estimate as an input to the process for generating the image.

20. A method according to claim 19, wherein:
extracting coherent energy from the intermediate earth response identifies one or more angles of coherence; and
the one or more angles of coherence are used to determine the contributions to the receiver wavefield that correspond to the extracted coherent energy.

21. A method according to claim 19, further comprising:
after a last iteration, adding the intermediate earth response estimate to the final earth response estimate.

* * * * *